United States Patent [19]

Cohen

[11] Patent Number: 4,949,187

[45] Date of Patent: Aug. 14, 1990

[54] VIDEO COMMUNICATIONS SYSTEM HAVING A REMOTELY CONTROLLED CENTRAL SOURCE OF VIDEO AND AUDIO DATA

[76] Inventor: Jason M. Cohen, 20 Skookwams Ct., West Islip, N.Y. 11795

[21] Appl. No.: 285,214

[22] Filed: Dec. 16, 1988

[51] Int. Cl.⁵ .................... H04M 11/00; H04N 7/10
[52] U.S. Cl. .................... 358/335; 358/903; 358/84; 358/85; 358/86; 358/102; 360/33.1; 360/15
[58] Field of Search ............ 358/903, 84, 85, 102, 358/86, 335; 360/91, 92, 33.1, 15; 364/84, 85

[56] References Cited

U.S. PATENT DOCUMENTS

| | | | |
|---|---|---|---|
| 3,718,906 | 2/1973 | Lightner | 360/15 |
| 3,990,710 | 11/1979 | Hughes | 369/30 |
| 4,232,295 | 11/1980 | McConnell | 340/152 |
| 4,597,058 | 6/1986 | Izumi et al. | 360/15 |
| 4,597,098 | 6/1986 | Noso et al. | 360/15 |
| 4,769,833 | 9/1988 | Farleigh | 455/4 |
| 4,789,961 | 12/1988 | Tindall | 360/33.1 |

Primary Examiner—Robert L. Richardson
Assistant Examiner—W. Daniel Swayze, Jr.
Attorney, Agent, or Firm—Michael I. Kroll

[57] ABSTRACT

A video communications system is provided that makes it possible for home viewers to download a movie in digital format from a large archive library, store the digital movie file locally, and view the movie at any convenient time. The system may limit access to particular movies and provides an accounting system that is used to bill downloads to the viewer's account as well as to post royalty payments to movie providers. Frequently viewed movies are quickly accessible via random access mass storage while infrequently viewed movies may be called up from a streaming tape archive. The digitalization of the program source allows for playback at various speeds, as well as pause, with no distortion or loss in picture quality.

19 Claims, 3 Drawing Sheets

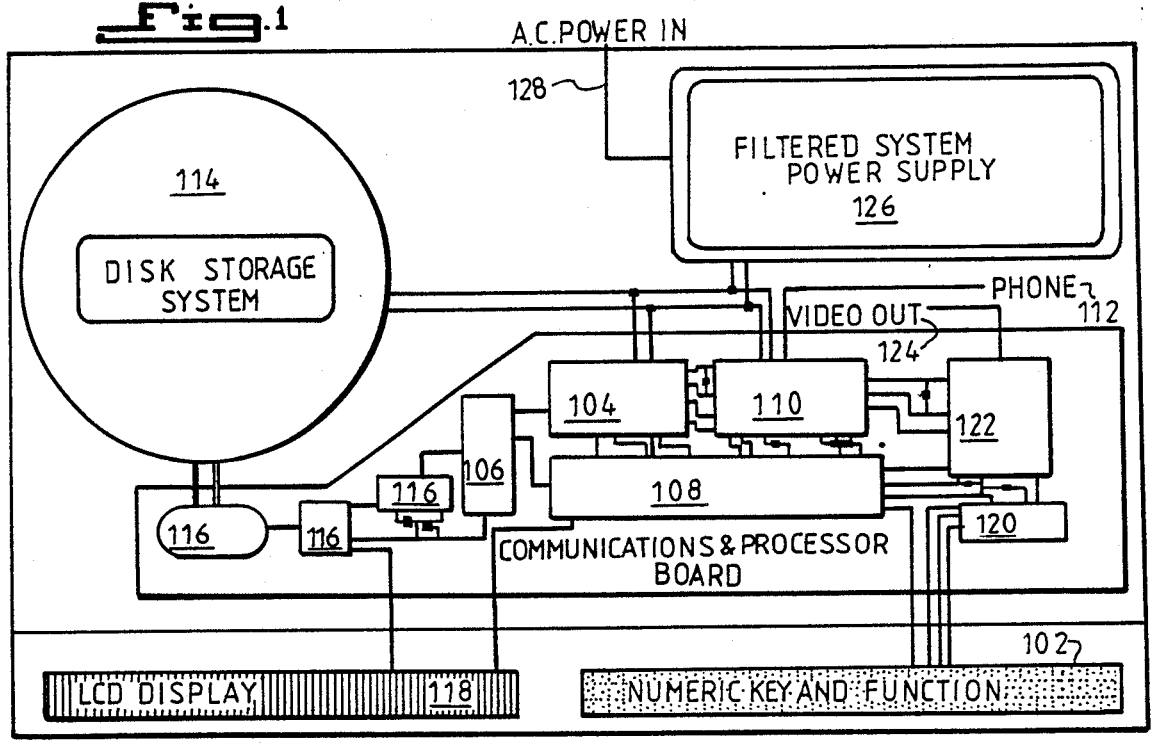
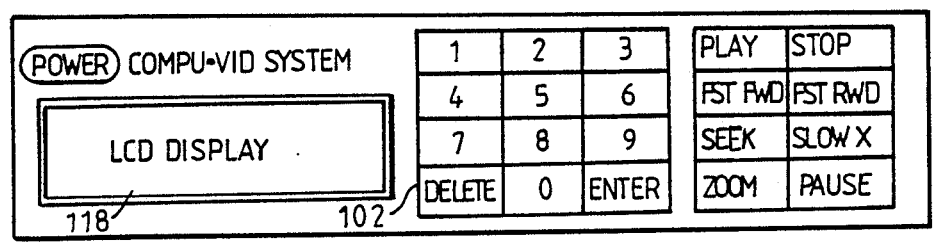
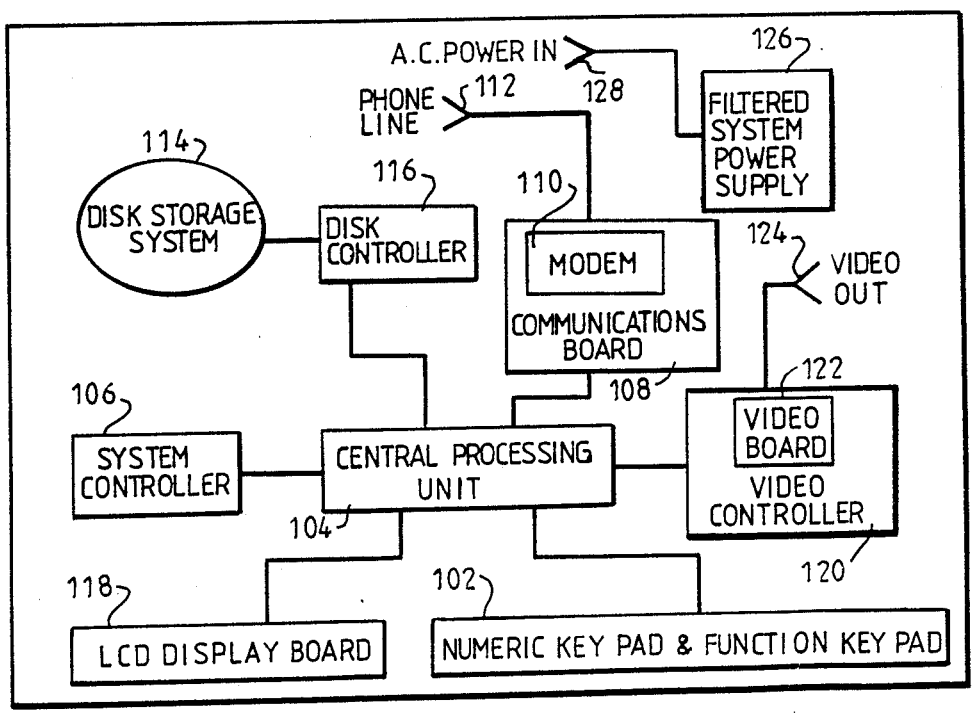

VIDEO COMMUNICATIONS SYSTEM HAVING A REMOTELY CONTROLLED CENTRAL SOURCE OF VIDEO AND AUDIO DATA

BACKGROUND OF THE INVENTION

The instant invention relates generally to the field of audio/video data retrieval systems, and, more specifically to systems that permit the viewing of a wide range of audio/video material by remote controlled access to an archival database.

Many homes have video cassette recorders and many also have access to cable television networks. These aids to home movie viewing have revolutionized the industry into its present form. However, both real time viewing via cable and broadcast networks, as well as viewing of cassette recording have serious drawbacks. First, for both broadcast and cable viewing, home viewers must watch the movies selected by the network, and must view the program material at time of transmission, or, perhaps time-shift viewing using a video cassette recorder. The viewer has the option of renting a cassette from one of the many retail stores established for this purpose, however, the store must be open and must stock the video tape. Further, even though the store may stock the video tape, the tape itself may not be available since it may be rented to another individual. Travelling to the video store may also be expensive and inconvenient, particularly in inclement weather.

Also, in the current VCR rental scenario, the movie industry is losing millions of dollars. Typically, a video store will purchase a few copies of a movie for $30-$100 each, but rent those movies hundreds of times with the movie industry cheated of its right to collect royalties for each viewer.

SUMMARY OF THE INVENTION

It is, therefore, a primary object of the instant invention to provide a video communications system that allows the home movie viewer to watch whatever movies he would like to watch, when he wants to see them.

Another object is to provide a video communications system that provides fast forward, rewind, and slow motion.

A further object is to provide a video communications system that utilizes digitalization to achieve this desired result. Audio and visual signals can be converted into ones and zeros: a process known as digitizing. Some common examples of this digitizing include compact disks for audio and laser disks for video. Modern computer systems can read, transmit, store and retrieve digital information. A computer can be given a block of information in binary form, and without knowing what that information means, the computer can store that information, and display it when needed. A audio and video segments of a movie can, therefore, be digitized. Various algorithms may be used to reduce the space that the data set takes on the computer storage systems.

A still further object is to provide a video communications system that, for each of the homes subscribing to the system, provides a unit about the size of a video cassette recorder located next to the television that houses: an LCD display, or any other practical display medium; a rotational disk storage system, either magnetic or optical; numerical entry keypad; and, a communications modem so that the unit can communicate to the user and the main computer system.

A yet further object is to provide a video communications system that provides movie listing to the user through a magazine-like publication. When a selection is found, the user turns on his home video unit, and selects the movie by number on the keypad. The video unit, which is connected to the household phone line or any other suitable communications medium, makes a local call to the central computer system. When the central computer answers and proper handshaking takes place, the data transfer process may begin. The number selected is given to the central computer, which in turn finds the data file and prepares it for downloading. The home viewer is prompted by the unit when the entire movie has been successfully downloaded and then the telephone connection is broken.

Another object is to provide a video communications system that allows the user to view the downloaded movie on his home unit with the ability to use fast forward, rewind, slow motion, zoom and direct seeking from both the unit itself and a remote control. The information held in the unit is on a rotational disk medium, magnetic or optical, and can be accessed in any order. In addition, because the information is digitally stored, viewing in the slow motion mode, or fast mode, will not introduce any distortion into the picture. Because the disk retains its memory, until erased or replaced, the movie will remain in the home unit until another is selected, or the user chooses to erase the memory contents. This means that if one family member loads a movie in the afternoon, and watches it in the afternoon, the movie will still be in the memory of the system when another family member comes home that night, and he can watch it also.

Another object is to provide a video communications system that can provide movie companies with royalties. Movie companies would give copies of their movies to the business providing the video service and receive royalties in return. The amount of these royalties would be based on the number of times the movie is downloaded. Using this strategy, the movie industry profits will increase over the present tape rental system.

Still another object is to provide a video communications system that allows "locking out". All movies in the system will be grouped by classification such as "G" rated, "PG", "Adult", etc. A user has the option to allow only certain types of movies to be loaded into their unit, or have a code number put on their account which must be entered into the unit when making a selection.

Another object is to provide a video communications system that supports community film files, archives and business files. The community film file is space allocated in the central computer system for access by specific communities. Files in this portion of the system may contain local events, film cuts from schools, etc. The archives of sport events, film series and old time classic films is not part of the community film file. The archives is a separate set of files available to all users in an area. The business files permit the selection of specialized business topics. Other specialized file possibilities include "how to . . . " self-help topics. Video processing will allow for windowing of files and for overlays.

A yet further object is to provide a video communications system whose configuration of modem clusters to control data communications between the CPU and external units may be of various forms, i.e. different amounts of memory on the individual channel interfaces, different baud rates based on hardware and mode of transmission such as fiber optic, or full/half duplex.

Another object is to provide a video communications system that may be used with information retrieval databases. This information retrieval applies to the storage of digitized images such as engine parts books, reference cards, etc.

Yet another object is to provide a video communications system whose terminal unit may be configured in other formats depending on specific needs. For instance, auto parts stores could incorporate the terminal into a single cabinet with keyboard and monitor to provide a complete inventory/parts lookup, pricing and record keeping system. The parts books for different cars and engines would be digitized, and stored on the system. These images can then have reference points (graphic and electronic) assigned to them. The images can then be compiled into a database for efficient lookup. This database of graphic parts books, including accessory books, can be transmitted via the video communications system network to parts departments in all locations, stored in the systems at those locations and used each day. When an update is made to reflect pricing changes, parts changes, etc., a new version is distributed. With this system, the user will have a conventional database containing information relative to the particular location, such as current stock, location of stock, orders placed, sales, etc. Area parts locations can custom configure their inventory and accounting systems, while utilizing the video graphics for inventory lookup, rather than using books and microfiche, while always maintaining the most recent diagrams.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The FIGURES in the drawings are briefly described as follows:

FIG. 1 is a top view of the terminal component of the invention showing disk storage system, circuit board, power supply, a display board, and filtered system power supply;

FIG. 2 is a front view of the terminal component of the invention showing a display, numeric key pad and function key pad;

FIG. 3 is an electronic block diagram of the terminal component of the invention; and, FIG. 4 is an electronic block diagram of the remotely-controlled central source of video and audio data.

DETAILED DESCRIPTION OF THE PREFERRED EMBODIMENTS

Figure 4:
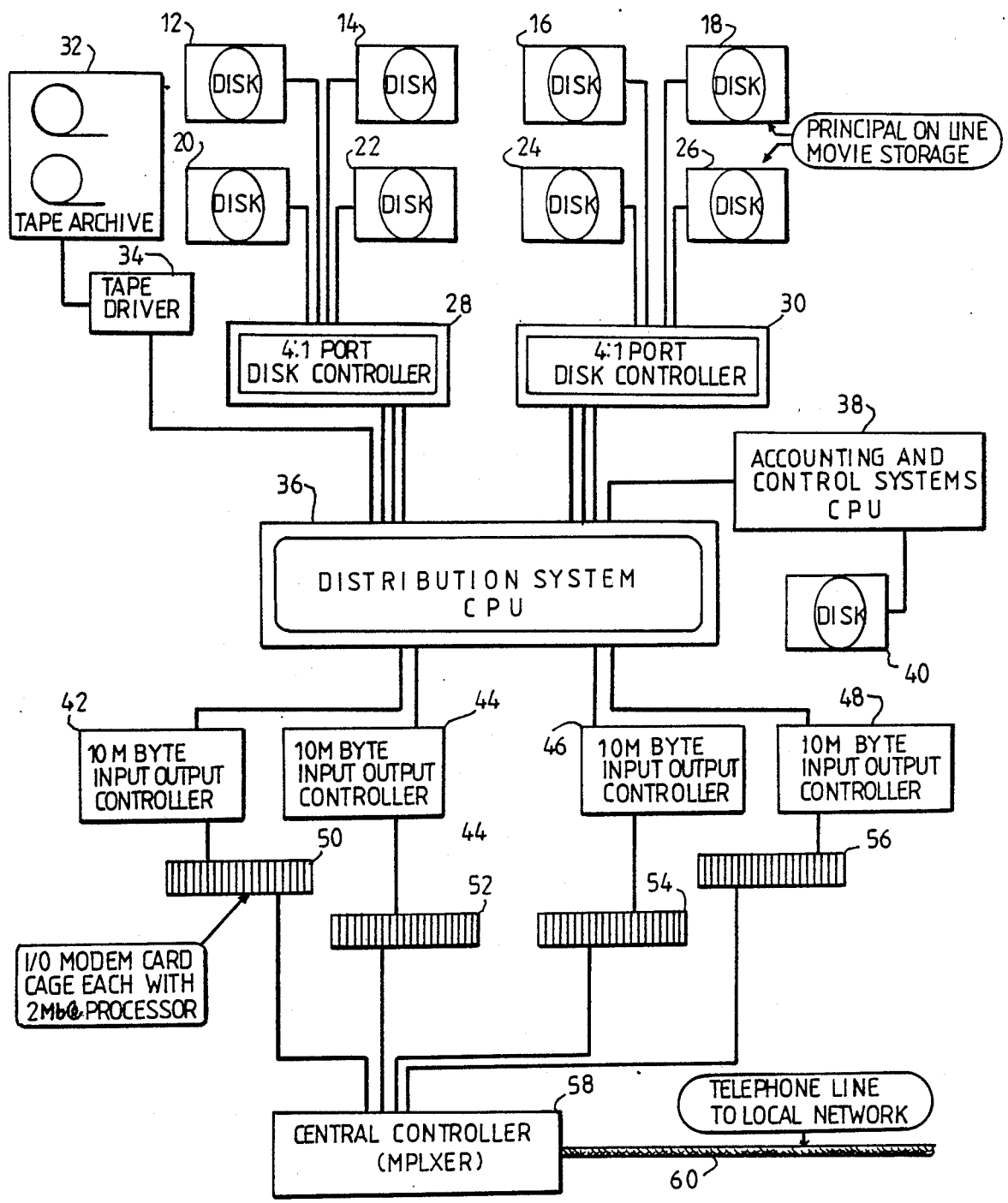

The invention is best understood by first referring to the remotely-controlled central source of video and audio data illustrated in FIG. 4. For the sake of this discussion, we will assume that the data archived and retrieved in this application is a digitized movie, although it is understood that the data may be of any type that may be stored digitally.

Movies that have been digitized and that need to be frequently accessed are stored on disks typified by 12, 14, 16, 18, 20, 22, 24 and 26. These disks may use magnetic media, such as hard disk drives, or optical media such as WMRM (write many read many) that permit an almost unlimited number of read/write cycles or WORM (write once read many). Each cluster of drives is controlled by a disk controller suitable to that drive configuration. In this example the cluster of four drives would utilize a 4:1 port disk controller, so that drives 12, 14, 20 and 20 are controlled by disk controller 28 while disks 16, 18, 24, and 26 are controlled by disk controller 30. Movies that are accessed only infrequently are archived on tape archival 32, controlled by tape driver 34. Tape archival 32 is typically a streaming tape drive offering the advantage of efficient mass storage but the disadvantage of requiring sequential access and not the random access of drives such as 12.

The distribution system CPU 36 controls the bidirectional flow of data from both types of drives depending upon commands issued by accounting and control systems CPU 38 which is equipped with its own disk 40. Accounting and control systems CPU 38 is programmed to limit access to the various categories of movies depending upon the access codes entered remotely by the user. Account information is stored on disc 40 for the purposes of billing and to keep track of movie downloading for the purpose of computing royalty payments based upon usage.

The problem of transmitting several movies simultaneously to different users is addressed by outputting the distribution systems CPUs data stream to a plurality of input/output controllers, each with buffering appropriate to the transmission capability of the installation, such as controllers 42, 44, 46, and 48. The output from these controllers, either in serial or parallel format format depending upon the design of the CPU chosen, is processed for transmission in serial bit-stream format by modems contained in card cages such as 50, 52, 54, and 56, each of which is equipped with its own dedicated processor. To make use of a single transmission media, such as a telephone line, a fiber optic cable network, a radio-frequency link, etc. a multiplexer 58 is used which may multiplex in the time domain or the frequency domain. In this embodiment, the output of multiplexer 58 is output to telephone line 60.

The remainder of the operation of the video communications system may best be understood with reference to FIGS. 1, 2 and three, all of which illustrate the terminal which resides at the viewing site. The user determines, from a listing provided by the service provider, which of the movies is to be downloaded. The movie title or code is entered through keypad 102 which is passed by central processing unit 104 and system controller 106 to communications board 108 which contains modem 110. Modem 110 converts the data to serial bit-stream format with respect to predetermined baud rate, communications protocols including word length, stop bits and parity. These are pre-set and do not change. The output of modem 110 is sent via phone line 112 to the remotely-controlled central source of video and audio data which responds by downloading the movie data file.

The downloading path is as follows: Incoming serial data on telephone line 112 is processed by modem 110 and is forwarded by central processing unit 104 to the disk storage system 114 via disk controller 116. Disk storage system 114 may be magnetic media such as a hard disk, or it may be optical media such WMRM or WORM drive. When the file (or files) are fully downloaded, the display 118 so indicates and the telephone link is broken.

To view the movie, the user selects the desired program source interactively using key pad 102 and LCD display 118. The central processing unit 104 directs disk controller 116 to have disk storage system 114 output the file, via the central processing unit 104, to video controller 120 which contains the video processing hardware, including decoding hardware, needed to allow commands entered on key pad 102, such as play, fast forward, seek #, zoom, stop, fast rewind, slow and pause, to operate. Video controller 120 contains a video board 122 that merges the video output of the video controller and the movie's audio signal into a composite video signal, output at 124.

Power to the system is supplied by filtered system power supply 126 operating upon AC power in at 128.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A video communications system comprising:
   (a) a remotely-controlled central source of video and audio data contained in mass storage and distributed therefrom, said remotely-controlled central source includes a plurality of hard disk drives each containing densely packed video and audio data, disk controllers connected to said disk drives wherein said disk controllers control the read/write cycles of said hard disk drives, a streaming tape archive for mass storage of such video and audio data not requiring the random access provided by said hard disk drives, said streaming tape archive being an accessory and not necessarily an integral part of said remotely-controlled central source, a tape driver connected to said streaming tape archive wherein said tape driver controls the read/write cycles of said streaming tape archive, said tape driver being an accessory and not necessarily an integral part of said remotely-controlled central source, a distribution system CPU connected to said disk controllers and said tape driver such that said distribution system CPU serves to direct video data bi-directionally, an accounting system hard disk containing an operating system and system commands as well as information relating to customer accounts, an accounting and control systems CPU that bi-directionally transmits and receives data from said accounting system CPU and acts as master over said distribution system CPU so that remote access to permitted subsets of data is limited and billing and data usage statistics are further provided, a plurality of modems to process the data from said distribution system CPU into a serial bit stream for transmission through a serial communications link to a plurality of modems disposed in said respective terminal unit, a plurality of input/output controllers each of which is disposed at said remotely controlled central source and is connected between said distribution system CPU and its respective said modem, a multiplexer whose inputs are the serial bit-stream outputs of said modems and whose output is connected to a transmission medium; and
   (b) a terminal unit having a microprocessor disposed at the home of the user so that an actual microprocessor based home terminal is provided, said terminal unit being coupled to said central source via a data link, such that video and audio data may be downloaded from said central source, stored locally within said terminal unit, and displayed at any time, said downloading coming from said central source when requested by said terminal unit and not vice versa, said terminal unit includes a communications board containing a modem for processing the incoming serial bit-stream data from a communications link into the appropriate format for storage and processing, a central processor unit, a disk storage system, a disk controller connected between said central processing unit and said disk storage system so that said central processing unit may read from or write to said disk storage system, a video controller board connected to said central processing unit whereby said video controller board processes video and audio data into a composite format for eventual video display and provides necessary decoding, a video board that takes said composite format and outputs a video signal for display on an accessory television or monitor, an alphanumeric display connected to said central processing unit such that said display provides an operator with information about the operation of said video communications system, a numeric key pad and function pad connected to said central processing unit such that said pads allow an operator to input operational instructions to said video communications system, a system controller to act as master over the central processing unit, and a filtered power supply to power said video communications system.

2. A video communications system, as recited in claim 1, wherein said transmission medium is a telephone line.

3. A video communications system, as recited in claim 1, wherein said transmission medium is a fiber optic cable.

4. A video communications system, as recited in claim 1, wherein said transmission medium is a radio-frequency communications link.

5. A video communications system, as recited in claim 1, wherein each of said controllers is configured with inputs equal or greater in number to the number of said disk drives connected to it.

6. A video communications system, as recited in claim 1, wherein said input/output controllers have sufficient capacity to support the transmission capability of the installation.

7. A video communications system, as recited in claim 1, wherein said modems reside in a modem card cage with a processor having sufficient capacity to support said system based on system capacity and communications capability.

8. A video communications system, as recited in claim 1, wherein said communications link is a telephone line.

9. A video communications system, as recited in claim 1, wherein said communications link is a fiber optic cable.

10. A video communications system, as recited in claim 1, wherein said communications link is a radio-frequency link.

11. A video communications system, as recited in claim 1, wherein said disk storage system is a rotational disk.

12. A video communications system, as recited in claim 1, wherein said storage system is a magnetic streaming tape cartridge.

13. A video communications system, as recited in claim 11, wherein said rotational disk uses magnetic storage media.

14. A video communications system, as recited in claim 11, wherein said rotational disk uses optical storage media.

15. A video communications system, as recited in claim 14, wherein said optical storage media is write-many-read-many (WMRM); thereby permitting an almost unlimited number of read/write cycles.

16. A video communications system, as recited in claim 14, wherein said optical storage media is write-once-read-many (WORM), thereby allowing one write cycle and an almost unlimited number of read cycles.

17. A video communications system, as recited in claim 1, wherein said alphanumeric display is an electro-optic display.

18. A video communications system, as recited in claim 17, wherein said electro-optic display is a liquid crystal display.

19. A video communications system, as recited in claim 1, wherein said input operational instructions include, but are not limited to: play, fast forward, seek, zoom, stop, fast rewind, slow, and pause; all of which are made possible by the digitalization of said video and audio data and the subsequent video processing.

* * * * *